Sept. 1, 1925.
H. E. MUCHNIC
GAUGE COCK
Filed Oct. 1, 1923
1,551,683
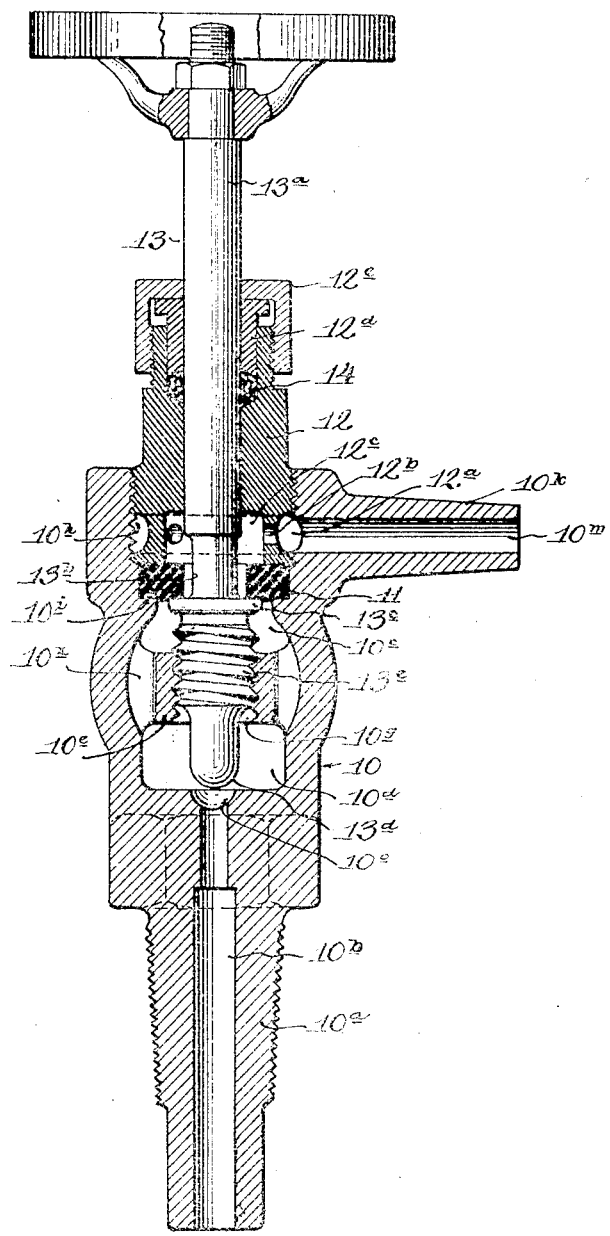

Patented Sept. 1, 1925.

1,551,683

UNITED STATES PATENT OFFICE.

HENRY E. MUCHNIC, OF ATCHISON, KANSAS.

GAUGE COCK.

Application filed October 1, 1923. Serial No. 665,749.

*To all whom it may concern:*

Be it known that I, HENRY E. MUCHNIC, a citizen of the United States, residing at Atchison, in the county of Atchison and State of Kansas, have invented certain new and useful Improvements in a Gauge Cock, of which the following is a specification.

This invention relates to improvements in gauge cocks, and has for its object to provide a device of that character which is more economical to manufacture than present day devices, and one in which replacement of the washer may be quickly and readily effected while the valve is in position cutting off the flow of fluid from the boiler, or the like, to which the cock is attached.

These and other objects are more fully set forth and described in the following specification and shown in the accompanying drawing, in which I have shown one embodiment of my invention in-longitudinal section, the valve member being shown in elevation.

In the drawings, 10 designates the body of the gauge cock having the tapered threaded shank $10^a$ adapted to be inserted in a boiler, as is well known. An inlet duct $10^b$ and an outlet duct $10^c$ is provided, the former leading to and the latter leading from the central or main chamber $10^d$ which is divided by the boss or partition $10^e$ in which are formed the by-passages $10^f$ permitting flow from the inlet duct to the outlet duct. The boss $10^e$ is provided with a central threaded aperture $10^g$. In the upper part of the body portion 10 is provided a bore or aperture $10^h$, at the bottom of which is provided a shoulder $10^i$ upon which seats the washer 11 of fiber or other material.

Projecting laterally from the body portion 10 is the elbow member $10^k$ in which is provided the discharge duct $10^m$ leading to the atmosphere from the bore $10^h$.

Threaded into the bore $10^h$ is the stuffing box sleeve 12 having a peripheral groove $12^a$ and ports $12^b$ leading from the chamber $12^c$ on the interior of the sleeve 12, the groove $12^a$ being in alinement with discharge duct $10^m$ when in assembled position, the chamber $12^c$ forming a continuation of the outlet duct $10^c$. Stuffing box sleeve 12 contacts with one side of the washer and serves to maintain the same on shoulder $10^i$, the stuffing box sleeve 12 carrying the usual gland $12^d$ and nut $12^e$, and being apertured to closely fit the stem $13^a$ of valve member 13, as shown in the drawing, packing 14 being provided to prevent leakage around the stem $13^a$ in well known manner.

Valve 13 is provided with the reduced portion $13^b$ extending through the aperture in washer 11 and provides a clearance through which escaping fluid may pass when the valve permits. Beneath the reduced portion $13^b$ is the flange $13^c$ adapted to contact with the lower side of washer 11 to close outlet duct $10^c$ as will be obvious. At its lower extremity, the valve is rounded, at $13^d$, to coact with the correspondingly formed valve seat $10^o$ surrounding the upper end of inlet duct $10^b$. Intermediate the flange $13^c$ and rounded extremity $13^d$ is the threaded portion $13^e$ engaging the threaded aperture $10^g$ so that the valve 13 may be screwed up or down to close the aperture in washer 11 or the inlet duct $10^b$. Intermediate its limit of normal travel a flow of fluid is permitted through the inlet duct $10^b$, chamber $10^d$, by-passages $10^f$, outlet duct $10^c$, ports $12^b$ and discharge duct $10^m$.

When discharge of fluid is not desired, valve 13 is in the normal position shown in the drawings cutting off the discharge duct $10^m$ from the inlet.

When it is desired to replace the washer 11, it is merely necessary to move the valve 13 to the position closing inlet duct $10^b$ after which the sleeve 12 may be unscrewed with the stuffing-box to permit the removal of the washer 11 and replacement, this operation requiring little time and not interfering with the closing function of the valve.

It will be obvious that my invention is susceptible of modification, and I do not wish to be restricted to the form shown and described, except as defined in the appended claims.

What I claim is:

1. A gauge cock comprising a body portion having a main chamber, an outlet duct leading therefrom and an inlet duct leading thereto, a boss in said chamber having a central threaded aperture and by-passages, a valve member threaded to engage said aperture, said valve member being movable to close one of said ducts at one extremity of its movement and to close the outlet end of the other at the other extremity of such movement, a washer contactable by said valve member in one closing position, a threaded stuffing box sleeve surrounding said valve member; said body portion being apertured and threaded to accommodate said sleeve, said sleeve being externally grooved and provided with ports leading from the interior of said sleeve to said groove.

2. A gauge cock comprising a body portion having a main chamber, an outlet duct leading therefrom and an inlet duct leading thereto, a boss in said chamber having a central threaded aperture and by-passages, a valve member threaded to engage said aperture, said valve member being movable to close one of said ducts at one extremity of its movement and to close the outlet end of the other at the other extremity of such movement, a washer contactable by said valve member in one closing position, a threaded stuffing box sleeve surrounding said valve member; said body portion being apertured and threaded to accommodate said sleeve, said sleeve being externally grooved and provided with ports leading from the interior of said sleeve to said groove; said body portion having a shoulder at the bottom of said threaded aperture, said washer seated thereon, said stuffing box sleeve holding said washer against said shoulder, when in assembled relation.

3. A gauge cock comprising a body portion having a main chamber, an outlet duct leading therefrom and an inlet duct leading thereto, a boss in said chamber having a central threaded aperture and by-passages, a valve member threaded to engage said aperture, said valve member being movable to close one of said ducts at one extremity of its movement and to close the outlet end of the other at the other extremity of such movement, a washer contactable by said valve member in one closing position, a threaded stuffing box sleeve surrounding said valve member; said body portion being apertured and threaded to accommodate said sleeve, said sleeve being externally grooved and provided with ports leading from the interior of said sleeve to said groove, said body portion having a shoulder at the bottom of said threaded aperture; said washer seated thereon, said stuffing box sleeve holding said washer against said shoulder when in assembled relation; said body portion having a discharge duct and communicating with said groove in said sleeve.

In testimony whereof, I have subscribed my name.

HENRY E. MUCHNIC.